United States Patent [19]

Idota

[11] Patent Number: 5,196,278
[45] Date of Patent: Mar. 23, 1993

[54] LITHIUM SECONDARY BATTERY WITH A CATHODE COMPRISING LITHIUM, COBALT AND VANADIUM

[75] Inventor: Yoshio Idota, Kanagawa, Japan

[73] Assignee: Fuji Photo Film Co., Ltd., Kanagawa, Japan

[21] Appl. No.: 846,925

[22] Filed: Mar. 6, 1992

[30] Foreign Application Priority Data

Mar. 7, 1991 [JP] Japan .................. 3-042010

[51] Int. Cl.$^5$ .................. H01M 4/58; H01M 6/16
[52] U.S. Cl. .................. 429/194; 429/218
[58] Field of Search .................. 429/218, 194

[56] References Cited

U.S. PATENT DOCUMENTS 4,366,215  12/1982  Coetzer et al. .................. 429/218 X

FOREIGN PATENT DOCUMENTS 1-231271  9/1989  Japan .
2-012768  1/1990  Japan .

*Primary Examiner*—John S. Maples
*Attorney, Agent, or Firm*—Sughrue, Mion, Zinn, Macpeak & Seas

[57] ABSTRACT

A lithium secondary battery comprising an anode active material which contains at least one member selected from the group consisting of lithium, a lithium alloy, and a compound capable of intercalating and deintercalating lithium, a cathode active material, and an electrolyte which is an organic electrolyte containing a lithium salt, wherein said cathode active material is a crystalline compound obtained by mixing a lithium compound, a cobalt compound, and a vanadium compound in a molar ratio of x:y:z, respectively, wherein x is from 0 to 1.1, y is from 0.12 to 0.98, and z is $1-y$, and heating the mixture.

7 Claims, 1 Drawing Sheet

FIGURE
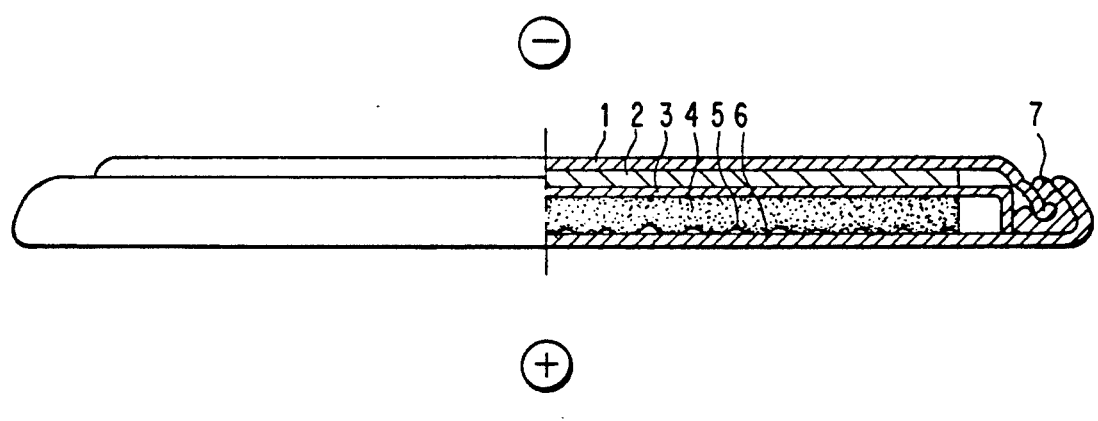

LITHIUM SECONDARY BATTERY WITH A CATHODE COMPRISING LITHIUM, COBALT AND VANADIUM

FIELD OF THE INVENTION

The present invention relates to a secondary battery having a high discharge working voltage and improved charge-discharge characteristics.

BACKGROUND OF THE INVENTION

Among lithium secondary batteries employing various cathode active materials, those employing $V_6O_{13}$, a vanadium oxide, as the active material, are characterized as having large discharge capacities but have a drawback of being low in discharge voltage. Those employing $V_2O_5$ as the active material show high discharge voltages but are disadvantageous in that the discharge curves are two-level curves. Those employing $V_6O_{13}$ and $V_2O_5$ are disadvantageous in that the charge discharge cycle in 100% depth is weak. Those employing metal oxide composite compounds such as amorphous $V_2O_5$ or amorphous $V_2O_5$ and $Co_2O_3$ (JP-A-1-231271) are good in charge-discharge cycle characteristics but they are disadvantageous in that discharge capacities are low and the evenness of the discharge curves are not sufficient. Those employing composite compounds in which 5 to 10 mol % of oxides such as $Co_3O_4$ is added to $V_2O_5$ (JP-A-2-12768) have high discharge capacities but the charge-discharge cycle characteristics are practically insufficient. Those employing spinel-type $LiMn_2O_4$ as the active material show poor charge-discharge cycle characteristics, and consequently, an improvement in this respect is desired. In addition, though it is well known to use $LiCoO_2$ as an cathode active material in a lithium battery (JP-A-52-12424, JP-A-60-127669, U.S. Pat. Nos. 3,945,848, 4,340,652, and 4,567,061), $LiCoO_2$ is high charge potential and oxidative degradates an electrolytic solution, then the charge-discharge cycle characteristics is insufficient, and consequently, an improvement in this respect is desired. JP-A-62-256371 discloses composite oxides represented by $LiMO_2$ (M=Co, Ni, V, Cr, Fe) and discloses that among them $LiMO_2$ is a layer rock salt crystalline structure such as $LiCoO_2$, and further, it relates to a primary battery. (The term "JP-A" as used herein means an "unexamined published Japanese patent application".)

SUMMARY OF THE INVENTION

An object of the present invention is to provide a lithium secondary battery employing a specific cathode active material which enables the battery to have a high discharge working voltage and good charge-discharge cycle characteristics.

The above and other objects of the present invention are accomplished with a lithium secondary battery comprising an anode active material which contains at least one member selected from the group consisting of lithium, a lithium alloy, and a compound capable of intercalating and deintercalating lithium, a cathode active material, and an electrolyte which is an organic electrolyte containing a lithium salt, wherein the cathode active material is a compound obtained by mixing a lithium compound, a cobalt compound, and a vanadium compound in a molar ratio of x:y:z, respectively, wherein x is from 0 to 1.1, y is from 0.12 to 0.98, and z is 1-y, and heating the mixture.

BRIEF DESCRIPTION OF THE DRAWING

The figure is a sectional view illustrating the coin-type battery fabricated in Examples.

DETAILED DESCRIPTION OF THE INVENTION

Examples of the lithium compound include an oxygen compound, an oxygen acid, and a halide. Examples of the cobalt compound include an oxide, a salt or a complex salt each containing a 2 to 4 valent cobalt. Examples of the vanadium compound include an oxide, a sulfate or a halide each containing a 2 to 5 valent vanadium.

Preferred lithium compounds include lithium hydroxide, a lithium oxygen acid or a lithium halide. Preferred cobalt compounds include an oxide, a salt or an ammine complex salt each containing a di, tri or tetra-valent cobalt. Preferred vanadium compounds include an oxide, a sulfate or a halide containing a tetra or penta-valent vanadium.

Typical lithium compounds include lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium tetrafluoroborate, lithium hexafluorophosphate, lithium fluoride, lithium chloride, lithium bromide, lithium iodide, etc.

Typical cobalt compounds include $Co_2O_3$, $Co_3O_4$, $CoO_2$, $LiCoO_2$, a di, tri or tetra-valent cobalt-containing cobalt carbonate, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide or cobalt iodide, and, as a hexaammine cobalt complex salt, hexaamminecobalt sulfate, hexaamminecobalt nitrate, hexaamminecobalt perchlorate, hexaamminecobalt thiocyanate, hexaamminecobalt oxalate, hexaamminecobalt acetate, hexaamminecobalt fluoride, hexaamminecobalt chloride, hexaamminecobalt bromide, and hexaamminecobalt iodide, etc.

Typical tetra- or penta-valent vanadium compounds include $VOp$ (p=2 to 2.5), a $VOp$ lithium compound, ammonium metavanadate, ammonium orthovanadate, ammonium pyrovanadate, vanadium oxysulfate, vanadium oxytrichloride, vanadium tetrachloride, etc.

In a combination of a lithium compound, a cobalt compound and a vanadium compound, it is preferred to use lithium hydroxide, a lithium oxygen acid or a lithium salt (as a lithium compound), a di-, tri-, or tetra-valent cobalt oxide, a cobalt salt or a cobalt ammine complex salt (as a cobalt compound), and a tetra- or penta-valent vanadium oxide, vanadium sulfate or a vanadium halide (as a vanadium compound). In particular, it is preferred to combine lithium carbonate, lithium hydroxide, or lithium chlorate with cobalt carbonate, cobalt nitrate, cobalt oxalate (each a divalent cobalt compound), $Co_2O_3$ or $Co_3O_4$ with ammonium metavanadate or vanadium pentoxide. Of these, it is particularly preferred to use a combination of lithium carbonate with cobalt carbonate with ammonium metavanadate.

The compound to be employed as the cathode active material in the secondary battery of the present invention can be obtained by heating a mixture of a lithium compound, a cobalt compound and a vanadium compound which are each decomposable and/or fusible at 2,000° C. or less. Heating may be conducted in air or an inert gas (e.g., nitrogen gas, argon gas). Heating temperature is preferably from 250° to 2,000° C., more preferable 500° to 1,300° C.

In the mixture to be heated for producing the compound employed as the cathode active material in the battery of the present invention, it is preferable that the molar proportion of the lithium compound, x, be from 0 to 1.1, that of the cobalt compound, y, be from 0.12 to 0.98, and that of the vanadium compound, z, be $1-y$, with the more preferred range of x being from 0.05 to 0.7 and that of y being from 0.15 to 0.5 or that of x being from 0.8 to 1.1 and that of y being 0.8 to 0.96. Furthermore, it is particularly preferred that x be from 0.05 to 0.6 and y be from 0.15 to 0.4 or x be from 0.8 to 1.0 and y be from 0.9 to 0.95.

The compound obtained by heating the above-described mixture can be represented by the formula (measurement: inductively coupled plasma (ICP) emission spectroscopy, as a simple method, calculated by the weight difference before and after heating a powder):

$$Li_xCo_yV_zO_q$$

where x is from 0 to 1.1, y is from 0.12 to 0.98, z is $1-y$, and q is from 2.05 to 3.0.

Preferably, the compound can be represented by the formula:

$$Li_xCo_yV_zO_q$$

where x is from 0.05 to 0.7, y is from 0.12 to 0.5, z is $1-y$, and q is from 2.05 to 2.9 or x is from 0.8 to 1.1, y is from 0.8 to 0.96, z is $1-y$, and q is from 2.05 to More preferably, the compound can be represented by the formula:

$$Li_xCo_yV_zO_q$$

where x is from 0.05 to 0.6, y is from 0.15 to 0.4, z is $1-y$, and q is from 2.05 to 2.8 or x is from 0.8 to 1, y is from 0.9 to 0.95, z is $1-y$, and q is 2.05 to 2.4.

By X-ray analysis, all these oxides are crystalline.

x is a value before the charge-discharge. The actual x value during the charge-discharge is within 0 and 1.1.

Materials that are used as the anode active material in the present invention include lithium metal and lithium alloys with Al, Al-Mn (U.S. Pat. No. 4,820,599), Al-Mg (JP-A-57-98977), Al-Sn (JP-A-63-6742), Al-In, Al-Cd (JP-A-1-144573), and the like. (The term "JP-A" as used herein means an "unexamined published Japanese patent application".)

Examples thereof further include compounds capable of intercalating and deintercalating lithium ions or lithium metal such as, for example, heated carbonaceous compounds as disclosed in JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, and JP-A-1-274360.

Examples thereof further include transition metal chalcogenide compounds capable of intercalating and deintercalating lithium ions or lithium metals such as $Nb_2O_5$ lithium compounds (JP-B-62-59412, JP-A-2-82447), $Fe_2O_3$ lithium compounds (JP-A-3-112070), $TiS_2$ lithium compounds (U.S. Pat. No. 4,983,476), and the like. (The term "JP-B" as used herein means "examined Japanese patent publication.)

Electrode additives may usually contain an electrically conductive material such as, for example, carbon, silver (JP-A-63-148554), or a poly(phenylene derivative) (JP-A-59-20971).

The electrolyte is an organic electrolyte consisting of an organic solvent, which is either a non-protonic organic solvent or a mixed solvent composed of one or more non-protonic organic solvents, and two or more lithium salts soluble in the solvent. Examples of such non-protonic organic solvents include propylene carbonate. ethylene carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric triesters (JP-A-60-23973), trimethoxymethane (JP-A-61-4170), dioxolane derivatives (JP-A-62-15771, JP-A-62-22372, and JP-A-62-108474), sulfolane (JP-A-62-31959), 3-methyl-2-oxazolidinone (JP-A-62-44961), propylene carbonate derivatives (JP-A-62-290069 and JP-A-62-290071), tetrahydrofuran derivatives (JP-A-63-32872), ethyl ether (JP-A-63-62166), 1,3-propane sultone (JP-A-63-102173), and the like. Examples of the lithium salts include lithium salts with $ClO_4^-$, $BF_6^-$, $PF_6^-$, $CF_3SO_3^-$, $CF_3CO_2^-$. $AsF_6^-$, $SbF_6^-$, $B_{10}Cl_{10}$ (JP-A-57-74974), (1,2-dimethoxyethane)$_2$-$ClO_4^-$ (JP-A-57-74977), lower aliphatic carboxylic acids (JP-A-60-41773), $AlCl_4^-$, $Cl^-$, $Br^-$, $I^-$ (JP-A-60-247265), chloroborane compounds (JP-A-61-165957), tetraphenylboric acid (JP-A-61-214376), and the like. A representative electrolytic solution is one comprising a mixed solvent consisting of propylene carbonate and 1,2-dimethoxyethane or ethylene carbonate or diethyl carbonate and either $LiClO_4$ or $LiBF_6$ or $LiPF_6$ dissolved in the solvent.

Along with the above-described electrolytic solution, a solid electrolyte may be used which can be inorganic or organic.

Well known as inorganic solid electrolytes include nitrides, halides, and oxyacid salts of Li and similar compounds of Li. Of these, $Li_3N$, LiI, $Li_5NI_2$, $Li_3N$-LiI-LiOH, $LiSiO_4$, $LiSiO_4$-LiI-LiOH (JP-A-49-81899), $xLi_3PO_4$-(1-x)$Li_4SiO_4$ (JP-A-59-60866), $Li_2SiS_3$ (JP-A-60-501731), phosphorus sulfide compounds (JP-A-62-82665), and the like are especially useful.

Useful organic solid electrolytes include a poly(ethylene oxide derivative) or a polymer containing such derivative (JP-A-63-135447), a poly(propylene oxide derivative) or a polymer containing such derivative, polymers containing an ionizable group (JP-A-62-254302, JP-A-62-254303, and JP-A-63-193954), mixtures of a polymer containing an ionizable group and such a non-protonic electrolytic solution as those described above (U.S. Pat. Nos. 4,792,504 and 4,830,939, JP-A-62-22375, JP-A-62-22376, JP-A-63-22375, JP-A-63-22776, and JP-A-1-95117), and phosphate polymers (JP-A-61-256573).

An electrolytic solution to which polyacrylonitrile has been added may also be used (JP-A-62-278774). Further, combined use of an inorganic solid electrolyte and an organic solid electrolyte is also known (JP-A-60-1768).

A separator, which may be employed in the battery of the present invention, is an insulating thin film having high ion permeability and mechanical strength not lower than a prescribed level. As the separator, a polyolefin nonwoven fabric such as a polypropylene nonwoven fabric, glass fibers, or the like, may be used from the standpoints of organic solvent resistance and hydrophobicity.

It is known that the compounds enumerated below are added to electrolytes in order to improve discharge characteristics and charge-discharge characteristics. Exemplary additive compounds include pyridine (JP-A-49-108525), triethyl phosphite (JP-A-47-4376), triethanolamine (JP-A-52-72425), cyclic ethers (JP-A-57-152684), ethylenediamine (JP-A-58-87777), n-glyme (JP-A-58-87778), hexaphosphoric triamide (JP-A-58-87779), nitrobenzene derivatives (JP-A-58-214281), sulfur (JP-A-59-8280), quinoneimine dyes (JP-A-59-68184), an N-substituted oxazolidinone and an N,N'-substituted imidazolidinone (JP-A-59-154778), ethylene glycol dialkyl ethers (JP-A-59-205167), quaternary ammonium salts (JP-A-60-30065), poly(ethylene glycol) (JP-A-60-41773), pyrrole (JP-A-60-79677), 2-methoxyethanol (JP-A-60-89075), $AlCl_3$ (JP-A-61-88466), monomers for conductive-polymer electrode active materials (JP-A-61-161673), triethylenephosphoramide (JP-A-61-208758), trialkylphosphines (JP-A-62-80976), morpholine (JP-A-62-80977), aryl compounds having a carbonyl group (JP-A-62-86673), hexamethylphosphoric triamide and a 4-alkylmorpholine (JP-A-62-217575), bicyclic tertiary amines (JP-A-62-217578), oils (JP-A-62-287580), quaternary phosphonium salts (JP-A-63-121268), tertiary sulfonium salts (JP-A-63-121269), and the like.

It is possible to employ an electrolytic solution in which a halogen-containing solvent such as, for example, carbon tetrachloride or ethylene chloride trifluoride has been incorporated in order to make the electrolytic solution non-combustible (JP-A-48-36632). It is also possible to employ an electrolytic solution in which carbonic acid gas has been dissolved in order to impart high-temperature storage suitability to the electrolytic solution (JP-A-59-134567).

The cathode active material may be one which contains therein an electrolytic solution or an electrolyte. For example, incorporation of the above-described ion-conductive polymer, nitromethane (JP-A-48-36633), and an electrolytic solution (JP-A-57-124870) are known.

Further, the cathode active material may be one which has undergone surface modification. For example, the surface modification may be conducted by treating the surface of a metal oxide to be used as the active material with an esterifying agent (JP-A-55-163779), a chelating agent (JP-A-55-163780), an electrically conductive polymer (JP-A-58-163188 and JP-A-59-14274), or poly(ethylene oxide) or the like (JP-A-60-97561).

The anode active material may also be one which has undergone surface modification. Examples of the surface modification include forming a layer of an ion-conductive polymer or polyacetylene (JP-A-58-111276), treatment with LiCl (JP-A-58-142771), treatment with ethylene carbonate (JP-A-59-31573), and the like.

Examples of the carrier for the cathode active material include, besides ordinarily employed stainless steel, nickel, and/or aluminum foils, porous foamed metals (JP-A-59-18578), titanium (JP-A-59-68169), expanded metals (JP-A-61-264686), and punched metals. Examples of the carrier for the anode active material include, besides ordinarily employed stainless steel, nickel, titanium, and/or aluminum foils, porous nickel (JP-A-58-18883), porous aluminum (JP-A-58-38466), a sintered aluminum mass (JP-A-59-130074), a shape made up of aluminum fibers (JP-A-59-148277), silver-plated stainless steel (JP-A-60-41761), heated carbonaceous materials such as a heated phenolic resin (JP-A-60-112264), Al-Cd alloys (JP-A-60-211779), porous foamed metals (JP-A-61-74268), and the like.

The current collector is not particularly limited, and any electron conductor may be used as the collector so long as the electron conductor employed will not undergo a chemical change in the battery fabricated. Besides ordinarily employed stainless steel, titanium, and/or nickel, examples of the current collector include nickel-plated copper (JP-A-48-36627), titanium-plated copper, copper-treated stainless steel (JP-A-60-175373), and the like. In a spiral type battery, it is general to serve both as an electrode carrier and as a current collector.

The configuration of the battery may be, among others, any of a coin, button, sheet, and cylindrical types.

As described above, the lithium secondary battery of the present invention, which comprises a anode active material which contains at least one member selected from the group consisting of lithium, a lithium alloy, and a compound capable of intercalating and deintercalating lithium, an cathode active material, and an electrolyte which is an organic electrolyte containing a lithium salt, is characterized in that the cathode active material is a compound obtained by mixing a lithium compound, a cobalt compound, and a vanadium compound in a molar ratio of x:y:z, respectively, wherein x is from 0 to 1.1, y is from 0.12 to 0.98, and z is $1-y$, and heating the mixture.

Due to the specific cathode active material of the present invention, the battery of the present invention can have a high discharge working voltage and good charge-discharge cycle characteristics.

The present invention is illustrated in more detail by reference to the following examples, which should not be construed to be limiting the scope of the invention.

EXAMPLE 1

Cathode active materials were synthesized by the following Methods A to C (z value in the parenthesis was calculated by the above simple method of a heated sample).

Method A

Lithium carbonate, cobalt carbonate, and ammonium metavanadate were mixed in a mortar in amounts which were, respectively: (a) 0 mol, 0.15 mol, and 0.85 mol (z=2.3); (b) 0.1 mol, 0.12 mol, and 0.88 mol (z=2.3); (c) 0.1 mol, 0.15 mol, and 0.85 mol (z=2.3); (d) 0.5 mol, 0.15 mol, and 0.75 mol (z=2.6); (e) 0.2 mol, 0.2 mol, and 0.8 mol (z=2.3); (f) 0.2 mol, 0.4 mol, and 0.6 mol (z=2.2); (g) 0.2 mol, 0.5 mol, and 0.5 mol (z=2.1); (h) 0.2 mol, 0.6 mol, and 0.4 mol (z=2.1); (i) 1 mol, 0.7 mol, and 0.3 mol (z=2.3); (j) 1 mol, 0.8 mol, and 0.2 mol (z=2.2); (k) 1 mol, 0.9 mol, and 0.1 mol (z=2.2); (l) (l) 1 mol, 0.95 mol, and 0.05 mol (z=2.1); and (m) 1 mol, 0.98 mol, and 0.02 mol (z=2.1). Heating of these mixtures was carried out in an air atmosphere by heating the atmosphere from room temperature to 130° C., maintaining this temperature for 30 minutes, subsequently further raising the temperature of the atmosphere to 900° C., and then maintaining this temperature for 3 hours ((a) to (h)) and 6 hours ((i) to (m))

Method B

Lithium hydroxide, cobalt nitrate, and ammonium metavanadate were mixed in a mortar in amounts which were, respectively: (a) 0.1 mol, 0.15 mol, and 0.85 mol ($z=2.3$); (b) 0.2 mol, 0.15 mol, and 0.85 mol ($z=2.5$); (c) 0.2 mol, 0.2 mol, and 0.8 mol ($z=2.4$); (d) 1 mol, 0.9 mol, and 0.1 mol ($z=2.1$); and (e) 1 mol, 0.95 mol, and 0.05 mol ($z=2.1$). Heating of these mixtures was carried out in an air atmosphere by heating the atmosphere from room temperature to 130° C., maintaining this temperature for 30 minutes, subsequently further raising the temperature of the atmosphere to 800° C. ((a) to (c)) and 1,000° C. ((d) and (e)), and then maintaining this temperature for 12 hours ((a) to (c)) and 2 hours ((d) and (e)).

Method C

Lithium hydroxide, dicobalt trioxide, and vanadium pentoxide were mixed in a mortar in amounts which were respectively: (a) 0.1 mol, 0.15 mol, and 0.85 mol ($z=2.3$); (b) 0.2 mol, 0.15 mol, and 0.85 mol ($z=2.5$); (c) 0.2 mol, 0.2 mol, and 0.8 mol ($z=2.4$); (d) 1 mol, 0.9 mol, and 0.1 mol ($z=2.1$); and (e) 1 mol, 0.95 mol and 0.05 mol ($z=2.1$). Heating of these mixtures was carried out in an air atmosphere by heating the atmosphere from room temperature to 130° C., maintaining this temperature for 30 minutes, subsequently further raising the temperature of the atmosphere to 650° C. ((a) to (c)) and 900° C. ((d) and (e)), and then maintaining this temperature for 24 hours ((a) to (c)) and 6 hours ((d) and (e)).

84% by weight of each of the thus-synthesized cathode active materials was mixed with 10% by weight of acetylene black (as a conducting agent) and 6% by weight of tetrafluoroethylene (as a binder). Each of the thus-prepared mixtures was dried and then compression-molded into a pellet (15 mmΦ, 0.6 g in (a) to (g), 0.7 g in (h) to (k)) for use as a positive electrode.

As a anode active material, a 80:20 by weight lithium-aluminum alloy (15 mmΦ, 1.0 g) was used. As an electrolyte, use was made of a 1-mol/l $LiBF_4$ solution in a 1:1 by volume solvent mixture of propylene carbonate and 1,2-dimethoxyethane. Further, a microporous polypropylene nonwoven fabric was used as a separator after being impregnated with the electrolytic solution.

Using these materials, coin-type lithium batteries, as shown in the figure, were fabricated. In the figure, numeral 1 denotes a negative electrode cover, numeral 2 donates a pelleted negative electrode, numeral 3 donates a separator, numeral 4 donates a pelleted positive electrode, numeral 5 donates a current collector, numeral 6 donates a positive electrode case, and numeral 7 donated a gasket.

A: These lithium batteries were subjected to a charge-discharge test at a current density of 1 mA/cm$^2$, and a charge-discharge depth of 5 mAH.

B: These lithium batteries were subjected to a charge-discharge test at a current density of 1 mA/cm$^2$, and a 100% depth (1: 3.7 V to 1.7 V at A-(a) to (h), B-(a) to (c), and C-(a) to (c) and 2: 4.2 V to 3.2 V at A-(i) to (m), B-(d) and (e), and C-(d) and (e)), and the discharge capacities of the 10th cycle were determined.

EXAMPLE 2

Using cathode active materials A-(j) to (m), B-(d) and (e) and C-(d) and (e), as synthesized in Example 1, positive electrode pellets were prepared in the same manner as in Example 1. A negative electrode was prepared by mixing 90% by weight of a carbonaceous material obtained by heating a polyarilonitrile fiber at 3,000° C., as an anode active material, and 10% by weight of poly(vinylidene fluoride) and press-shaping the mixture into a pellet (15 mmΦ, 12 g).

Batteries were fabricated and subjected to a charge-discharge test in the same manner as in Example 1.

EXAMPLE 3

Using cathode active materials A-(j) to (m), B-(d) and (e), and C-(d) and (e), as synthesized in Example 1, positive electrode pellets were prepared in the same manner as in Example 1. A negative electrode was prepared by mixing 82% by weight of $Nb_2O_5$ as disclosed in JP-B-62-59142, as an anode active material, 8% by weight of poly(vinylidene fluoride), and 10% by weight of artificial graphite, and press-shaping the mixture into a pellet (15 mmΦ, 0.4 g).

Batteries were fabricated and subjected to a charge-discharge test in the same manner as in Example 1 (the charge-discharge finish voltage: 2.5 V to 1.0 V).

COMPARATIVE EXAMPLE 1

Compounds obtained by heating (a) $V_6O_{13}$, (b) $V_2O_5$, (c) a mixture of $LiCoO_2$ and $V_2O_5$ (20:80 by molar percent, wherein the molar amount is the same as in Example 1), (d) a mixture of 0.2 mol lithium carbonate, 0.1 mol dicobalt trioxide, and 0.9 mol vanadium pentoxide, in the same manner as in Method A, Example 1, (e) $LiCoO_2$ (after mixing lithium carbonate with cobalt carbonate, heated for 6 hours at 900° C.), and (f) a mixture of $LiCoO_2$ and $V_2O_5$ (95:5 by molar percent, wherein the molar amount is the same as in Example 1), were used as cathode active materials. Fabrication of batteries and evaluation thereof were conducted in the same manner as in Example 1. (The charge-discharge finish voltage, A: 3.7 V to 1.7 V at (a) to (d) of Comparative Example 1 and B: 4.2 V to 3.2 V at (e) and (f) of Comparative Example 1)

COMPARATIVE EXAMPLE 2

Compounds obtained by heating (a) $V_6O_{13}$, (b) $V_2O_5$, (c) a mixture of $LiCoO_2$ and $V_2O_5$ (20:80 by molar percent, wherein the molar amount is the same as in Example 1), (d) $LiCoO_2$ and (e) a mixture of $LiCoO_2$ and $V_2O_5$ (95:5 by molar percent, wherein the molar amount is the same as in Example 1), were used as cathode active materials and the carbonaceous material of Example 2 was used as an anode active material. Fabrication of batteries and evaluation thereof were conducted in the same manner as in Example 1. (The charge-discharge finish voltage, A: 3.7 V to 1.7 V at (a) to (c) of Comparative Example 2 and B: 4.2 V to 3.2 V at (d) and (e) of Comparative Example 2)

COMPARATIVE EXAMPLE 3

Compounds obtained by heating (a) $V_6O_{13}$, (b) $V_2O_5$, (c) a mixture of $LiCoO_2$ and $V_2O_5$ (20:80 by molar percent, wherein the molar amount is the same as in Example 1), (d) $LiCoO_2$, and (e) a mixture of $LiCoO$ and $V_2O_5$ (95:5 by molar percent, wherein the molar amount is the same as in Example 1), were used as cathode active materials and the $Nb_2O_5$ of Example 3 was used as an anode active material. Fabrication of batteries and evaluation thereof were conducted in the same manner as in Example 1. (The charge-discharge finish voltage: 2.5 V to 1.0 V)

The results obtained in Examples 1 to 3 and Comparative Examples 1 to 3 are summarized in Tables 1 to 4.

TABLE 1

(Example 1 and Example 2)

| No. | Cathode active material | A Discharge working voltage (V) | A Charge-discharge cycle life (cycles) | B Discharge capacity (mAh) |
|---|---|---|---|---|
| 1 | A-(a) | 3.1 | 400 | 82 |
| 2 | -(b) | 2.9 | 350 | 62 |
| 3 | -(c) | 3.2 | 800 | 80 |
| 4 | -(d) | 2.9 | 700 | 84 |
| 5 | -(e) | 3.0 | 500 | 60 |
| 6 | -(f) | 3.0 | 500 | 51 |
| 7 | -(g) | 2.9 | 460 | 35 |
| 8 | -(h) | 2.8 | 220 | 23 |
| 9 | -(i) | 3.4 | 150 | 8 |
| 10 | -(j) | 3.5 | 500 | 22 |
| 11 | -(k) | 3.9 | 600 | 38 |
| 12 | -(l) | 3.9 | 500 | 54 |
| 13 | -(m) | 3.8 | 150 | 22 |
| 14 | B-(a) | 3.2 | 550 | 75 |
| 15 | -(b) | 2.9 | 500 | 80 |
| 16 | -(c) | 3.0 | 400 | 58 |
| 17 | -(d) | 3.9 | 450 | 37 |
| 18 | -(e) | 3.9 | 400 | 45 |
| 19 | C-(a) | 3.2 | 500 | 72 |
| 20 | -(b) | 2.9 | 500 | 80 |
| 21 | -(c) | 3.0 | 700 | 65 |
| 22 | -(d) | 3.9 | 450 | 40 |
| 23 | -(e) | 3.9 | 400 | 45 |
| 24 | A-(j) | 3.3 | 450 | 32 |
| 25 | -(k) | 3.7 | 800 | 43 |
| 26 | -(l) | 3.7 | 900 | 52 |
| 27 | -(m) | 3.6 | 600 | 30 |
| 28 | B-(d) | 3.7 | 600 | 42 |
| 29 | -(e) | 3.7 | 700 | 45 |
| 30 | C-(d) | 3.7 | 500 | 35 |
| 31 | -(e) | 3.7 | 450 | 40 |

Note: Example 1 is Nos. 1 to 23 and Example 2 is Nos. 24 to 31.

TABLE 2

(Example 3)

| No. | Cathode active material | A Discharge working voltage (V) | A Charge-discharge cycle life (cycles) | B Discharge capacity (mAh) |
|---|---|---|---|---|
| 32 | A-(j) | 2.0 | 400 | 24 |
| 33 | -(k) | 2.4 | 600 | 37 |
| 34 | -(l) | 2.4 | 700 | 45 |
| 35 | -(m) | 2.2 | 350 | 22 |
| 36 | B-(d) | 2.4 | 400 | 32 |
| 37 | -(e) | 2.4 | 500 | 38 |
| 38 | C-(d) | 2.4 | 400 | 35 |
| 39 | -(e) | 2.4 | 350 | 42 |

TABLE 3

(Comparative Example 1 and 2)

| No.* | Cathode active material | A Discharge working voltage (V) | A Charge-discharge cycle life (cycles) | B Discharge capacity (mAh) |
|---|---|---|---|---|
| 1 | (a) | 2.8 | 500 | 0 |
| 2 | (b) | 2.9 | 500 | 0 |
| 3 | (c) | 3.0 | 200 | 10 |
| 4 | (d) | 2.9 | 100 | 60 |
| 5 | (e) | 3.9 | 80 | 15 |
| 6 | (f) | 3.8 | 70 | 13 |
| 7 | (a) | ** | 0 | 0 |
| 8 | (b) | ** | 0 | 0 |
| 9 | (c) | 3.6 | 90 | 18 |
| 10 | (d) | 3.6 | 450 | 25 |
| 11 | (e) | 3.6 | 200 | 22 |

*Comparative Example 1 is Nos. 1 to 6 and Comparative Example 2 is Nos. 7 to 11.
**Charge-discharge was impossible.

TABLE 4

(Comparative Example 3)

| No. | Cathode active material | A Discharge working voltage (V) | A Charge-discharge cycle life (cycles) | B Discharge capacity (mAh) |
|---|---|---|---|---|
| 12 | (a) | * | 0 | 0 |
| 13 | (b) | * | 0 | 0 |
| 14 | (c) | 2.2 | 100 | 6 |
| 15 | (d) | 2.2 | 230 | 18 |
| 15 | (e) | 2.2 | 180 | 15 |

*Charge-discharge was impossible.

EXAMPLE 4

X-ray Diffraction Pattern of the Compound in the Invention

The test was conducted using Cu-Kα as a X-ray, and 5.00° to 70.00° as a measurement angle (2θ), and A-(a) to (h) and A-(i) to (l) in Example 1 as the compound according to the present invention.

COMPARATIVE EXAMPLE 4

The test was conducted according to Example 4 except for using (e) in Comparative Example 1.

From the results, it has found that the X-ray diffraction pattern of A-(a) to (h) in Example 1 is completely different from that of LiCoO$_2$, and they have not a layer rock salt structure as shown in JP-A-62-256371. With respect to the X-ray diffraction pattern, the interlayer spacing and the peak intensity ratio are summarized in Tables 5 and 6. From the results of Tables 5 and 6 and following considerations, it has found that when a slight amount of a vanadium compound has added to a cobalt compound and heating of the mixture has conducted, an entirely new compound has been synthesized.

Specifically, the interlayer spacing 0f (003) was enlarged in 0.012 Angstrom (A) by adding a vanadium compound, and the interlayer spacing of (006) was also enlarged in 0.003 Angstrom. In average, the c axis length was enlarged in 0.027 Angstrom. In the same test, though the interlayer spacing of (101), (104) or (110) of the strong peak in LiCoO$_2$ was all similar value, it can be said the increase in the interlayer spacing of (003) and (006) is a significant difference. In addition, the X-ray diffraction pattern of LiCoO$_2$ which was heated in Comparative Example was well coincident with that of a standard compound in JCPDS (Joint Committee On Powder Diffraction Standard), 1985.

Furthermore, the peak intensity of 2.433 A was increased depending on the amount of a vanadium compound. Furthermore, new peakes were appeared on 4.129 A, 3.897 A, 2.728 A, and 1.839 A. These peaks were also increased depending on the amount of a vanadium compound. Furthermore, these peaks are not a main peak of representative vanadium compounds such as $V_2O_5$, $V_6O_{13}$, and $Li_{1.2}V_3O_8$.

TABLE 5

(Example 4 and Comparative Example 4)

| Compound | y | Interlayer Spacing (Å) | | | | |
|---|---|---|---|---|---|---|
| | | (003) | (006) | (101) | (104) | (110) |
| A-(i) | 0.7 | 4.691 | 2.342 | 2.402 | 2.004 | 1.406 |
| -(j) | 0.8 | 4.691 | 2.342 | 2.402 | 2.003 | 1.407 |
| -(k) | 0.9 | 4.691 | 2.342 | 2.402 | 2.004 | 1.406 |
| -(l) | 0.95 | 4.691 | 2.342 | 2.402 | 2.004 | 1.406 |
| (e) of Comp. Ex. 1 | 1.0 | 4.679 | 2.339 | 2.402 | 2.004 | 1.407 |

TABLE 6

(Example 4 and Comparative Example 4)

| Compound | y | Peak Intensity d(Å) 4.69 | Peak Intensity Ratio (%) d(Å) | | | | |
|---|---|---|---|---|---|---|---|
| | | | 4.69 | 4.13 | 3.9 | 2.73 | 2.43 | 2.40 |
| A-(i) | 0.7 | 1134 | 100 | 67.6 | 68.2 | 52.4 | 176 | 35.7 |
| -(j) | 0.8 | 2203 | 100 | 21.5 | 22.2 | 15.3 | 72.2 | 34.1 |
| -(k) | 0.9 | 12155 | 100 | 3.3 | 4.8 | 4.2 | 9.5 | 33.8 |
| -(l) | 0.95 | 11637 | 100 | 1.9 | 2.4 | 1.9 | 5.4 | 31.8 |
| (e) of Comp. Ex. 1 | 1.0 | 12113* | 100 | 0 | 0 | 0 | 4.3 | 19.9 |

*at 4.68Å

While the invention has been described in detail and with reference to specific embodiments thereof, it will be apparent to one skilled in the art that various changes and modifications can be made therein without departing from the spirit and scope thereof.

What is claimed is:

1. A lithium secondary battery comprising an anode active material which contains at least one member selected from the group consisting of lithium, a lithium alloy, and a compound capable of intercalating and deintercalating lithium, a cathode active material, and an electrolyte which is an organic electrolyte containing a lithium salt, wherein said cathode active material is a crystalline compound obtained by mixing a lithium compound, a cobalt compound, and a vanadium compound in a molar ratio of x:y:z, respectively, wherein x is from 0 to 1.1, y is from 0.12 to 0.98, and z is $1-y$, and heating the mixture.

2. The lithium secondary battery as claimed in claim 1, wherein at least one of said cathode active material is a crystalline compound obtained by mixing a lithium compound, a cobalt compound, and a vanadium compound in a molar ratio of x:y:z, respectively, wherein x is from 0 to 1.1, y is from 0.12 to 0.5, and z is $1-y$, and heating the mixture.

3. The lithium secondary battery as claimed in claim 1, wherein at least one of said cathode active material is a crystalline compound obtained by mixing a lithium compound, a cobalt compound, and a vanadium compound in a molar ratio of x:y:z, respectively, wherein x is from 0 to 1.1, y is from 0.8 to 0.98, and z is $1-y$, and heating the mixture.

4. The lithium secondary battery as claimed in claim 2, wherein said anode active material is lithium and/or a lithium alloy.

5. The lithium secondary battery as claimed in claim 1, wherein at least one of said cathode active material is a crystalline compound represented by $Li_xCo_yV_zO_q$ in which x is from 0 to 1.1, y is from 0.12 to 0.98, z is $1-y$, and q is from 2.05 to 3.0.

6. The lithium secondary battery as claimed in claim 1, wherein the heating temperature is from 250° to 2,000° C.

7. The lithium secondary battery as claimed in claim 1, wherein the heating temperature is from 500° to 1,300° C.

* * * * *